(12) United States Patent
Oetken et al.

(10) Patent No.: US 12,162,349 B2
(45) Date of Patent: Dec. 10, 2024

(54) CONTROLLING MACHINE OPERATION INCLUDING LIMITING MACHINE SPEED

(71) Applicant: Caterpillar Paving Products Inc., Brooklyn Park, MN (US)

(72) Inventors: Nicholas A. Oetken, Brooklyn Park, MN (US); Todd A. Impola, Minnetonka, MN (US); Timothy M. O'Donnell, Long Lake, MN (US); John L Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 426 days.

(21) Appl. No.: 17/164,382

(22) Filed: Feb. 1, 2021

(65) Prior Publication Data
US 2022/0242232 A1 Aug. 4, 2022

(51) Int. Cl.
*G06F 17/00* (2019.01)
*B60K 31/00* (2006.01)
*E01C 19/26* (2006.01)

(52) U.S. Cl.
CPC ...... *B60K 31/0008* (2013.01); *B60K 31/0075* (2013.01); *E01C 19/26* (2013.01); *B60K 2031/0016* (2013.01); *B60K 2031/0025* (2013.01); *B60K 2031/0033* (2013.01)

(58) Field of Classification Search
CPC ............ B60K 31/0008; B60K 31/0075; B60K 2031/0016; B60K 2031/0025; B60K 2031/0033; B60K 2031/0091; E01C 19/26; E01C 19/23; E01C 19/28; E01C 19/282; E01C 19/286; E01C 19/288; B60W 30/146; B60W 2300/17; B60W 2520/10; B60W 2540/18; B60W 2554/00; B60W 2554/4041; B60W 2554/802; B60W 2556/50; B60W 2720/10; B60Y 2200/41; G05D 1/0223
USPC ......................................................... 701/23
See application file for complete search history.

(56) References Cited

U.S. PATENT DOCUMENTS

| | | |
|---|---|---|
| 6,968,266 B2 | 11/2005 | Ahmed-Zaid et al. |
| 7,373,237 B2 | 5/2008 | Wagner et al. |
| 7,925,416 B2 | 4/2011 | Perisho, Jr. et al. |

(Continued)

FOREIGN PATENT DOCUMENTS

| | | |
|---|---|---|
| EP | 1096460 | 11/2001 |
| WO | 2019105583 | 6/2019 |

OTHER PUBLICATIONS

Oversteer/Understeer (Year: 2015).*

*Primary Examiner* — Ronnie M Mancho

(57) ABSTRACT

According to one example, a system for control of a movement of a working vehicle within a work area is disclosed. The system can optionally include a steering system configured to direct the movement of the working vehicle, an object detection system, as speed sensor, and a controller. The object detection system can have one or more sensors configured to detect an object within the work area. The speed sensor can be configured to measure a speed of the working vehicle over a surface within the work area. The controller can be communicatively coupled to the steering system, the object detection system and the speed sensor. The controller can be configured to control the speed of the working vehicle based upon a steering angle of the working vehicle.

10 Claims, 5 Drawing Sheets

(56) References Cited

U.S. PATENT DOCUMENTS

| | | | | |
|---|---|---|---|---|
| 8,423,254 | B2* | 4/2013 | Tanimichi | G08G 1/163 |
| | | | | 701/70 |
| 8,831,851 | B2* | 9/2014 | Canuto | B60T 8/246 |
| | | | | 701/72 |
| 9,267,245 | B1* | 2/2016 | Braun | B62D 12/00 |
| 9,594,376 | B2 | 3/2017 | Larsson | |
| 10,696,324 | B2* | 6/2020 | Oetken | B60W 30/18145 |
| 11,285,964 | B2* | 3/2022 | Norstad | B60G 17/06 |
| 11,460,855 | B1* | 10/2022 | Lim | G05D 1/0246 |
| 11,524,706 | B2* | 12/2022 | Kunihiro | B60W 50/12 |
| 2003/0158638 | A1* | 8/2003 | Yakes | G07C 5/008 |
| | | | | 180/65.245 |
| 2008/0091325 | A1* | 4/2008 | Yeoman | E02F 9/0841 |
| | | | | 701/69 |
| 2019/0202379 | A1* | 7/2019 | Omran | B60W 30/1882 |
| 2020/0114962 | A1* | 4/2020 | Oetken | B60W 10/04 |
| 2020/0324792 | A1* | 10/2020 | Kunihiro | B60W 50/082 |
| 2021/0009116 | A1* | 1/2021 | Fujiyoshi | E02F 9/262 |
| 2022/0057802 | A1* | 2/2022 | Spielman, Jr. | E02F 3/7636 |

\* cited by examiner

CONTROLLING MACHINE OPERATION INCLUDING LIMITING MACHINE SPEED

TECHNICAL FIELD

The present application relates to working vehicles, in particular, for example, agricultural, industrial, construction, paving or other heavy machinery. More particularly, the present application relates to working vehicles that have object detection systems.

BACKGROUND

Working vehicles are used to perform a variety of tasks. Such vehicles may operate in an autonomous or semi-autonomous manner to perform these tasks in response to sensors and commands. Such autonomous or semi-autonomous vehicles may utilize an object detection system. Commands can be generated as part of a work plan for the vehicles. The vehicles may receive instructions in accordance with the work plan to perform operations including compacting, paving, digging, loosening, carrying, etc. specific to industrial activities. The vehicles can respond to objects detected by the object detection system.

Autonomously operated vehicles may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks In a paving context, compactors have been developed for soil compaction as well as asphalt compaction. Compactors operation has been increasingly automated. Compaction of a construction material is recognized as being important for improving the stability of the material in construction operations such as soils and asphalt pavement. By compacting the surface, soil strength and stability can be increased to the magnitude required by the design. State Highway Agencies and contractors are concerned about quality control of the quality and/or extent of compaction of various types of terrains.

Various patents and patent applications such as U.S. Pat. Nos. 9,594,376 and 7,924,416 disclose controller implemented drive systems for turning of the vehicle. However, U.S. Pat. No. 7,924,416 relies on the vehicle's lateral acceleration to detect a turn and adaptively reduces speed according to the vehicle's position in the turn. U.S. Pat. No. 9,594,376 issues commands to an operator to avoid an obstacle.

SUMMARY

In an example, a system for control of a movement of a working vehicle within a work area is disclosed. The system can optionally include a steering system configured to direct the movement of the working vehicle, an object detection system, a speed sensor, and a controller. The object detection system can have one or more sensors configured to detect an object within the work area. The speed sensor can be configured to measure a speed of the working vehicle over a surface within the work area. The controller can be communicatively coupled to the steering system, the object detection system and the speed sensor. The controller can be configured to control the speed of the working vehicle based upon a steering angle of the working vehicle.

In another example, a working vehicle is disclosed. The working vehicle can include a steering system, an object detection system, a speed sensor and a controller. The steering system can be configured to direct the movement of the working vehicle. The object detection system can have one or more sensors configured to detect an object within the work area. The speed sensor can be mounted to the working vehicle and configured to measure a speed of the working vehicle over a surface within the work area. The controller can be coupled to the compactor and communicatively coupled to the steering system, the object detection system and the speed sensor. The controller can be configured to control the speed of the working vehicle based upon a location of an edge of a field of perception of the one or more sensors of the object detection system and a steering angle of the working vehicle.

In yet another example, a method for control of a movement of a working vehicle within a working area is disclosed. The method includes directing the movement the working vehicle with a steering system, sensing a speed of the compactor over a surface within the compacting area, providing an object detection system configured to sense a presence of an object adjacent the working vehicle, and controlling the speed of the working vehicle based upon a steering angle of the working vehicle.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Working vehicles such as compactors can be configured for autonomous or semi-autonomous operation. However, the object detection system(s) of such vehicles may have a reduced effectiveness in recognizing the presence of an object within the work area and in the path of the vehicle when the vehicle is being articulated (e.g., turned). For example, the object detection system may only be able to detect objects in front of or behind the vehicle within an angle of view of such system. The object detection system may not be capable of, or have limited capability of, detecting an object that is to the side of the vehicle but is in the path of the vehicle when the vehicle is articulated. Such an object may not be identified until it is too late to avoid the object.

In view of the foregoing problems, the present application recognizes a speed of the working vehicle can be limited based upon the steering angle of the working vehicle to allow for the capability of the working vehicle to avoid the object. Put another way, the present application recognizes vehicle speed should be limited. to account for the vehicle steering angle and taking into account the limitations of the object detection system. Thus, the present application recognizes a system can slow the vehicle during a turn to a sufficiently low speed to keep the object within a field of view of the object detection system such that it can be recognized and avoided.

Figure 1:
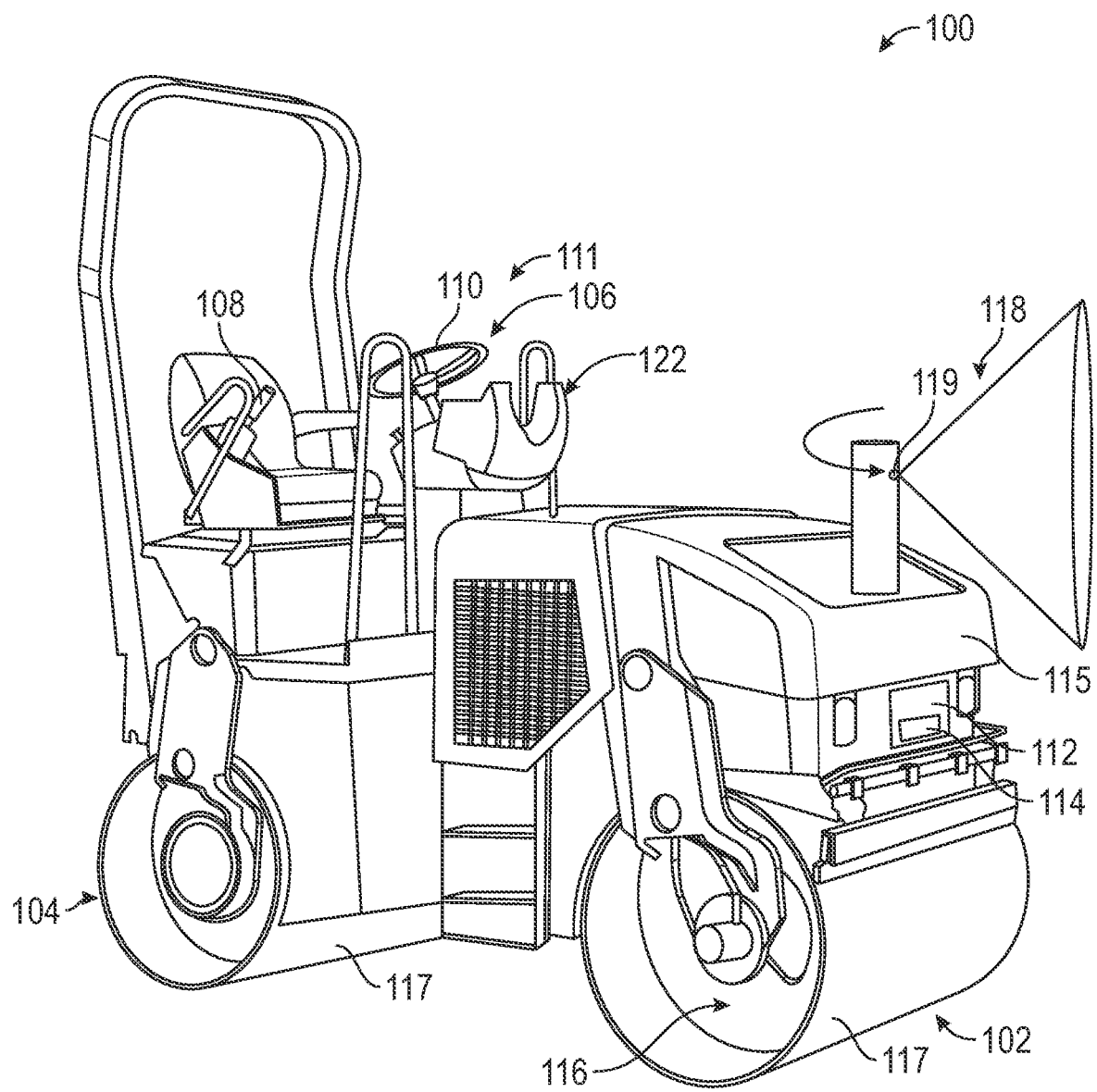
FIG. 1 depicts an example working vehicle comprising a compactor in accordance with this disclosure.

Referring to FIG. 1, a compactor 100 is shown according to one example of the present disclosure. The compactor 100 is illustrated as a self-propelled double drum compactor having a front drum 102 and a back drum 104. However, it should be recognized that the various systems, methods and techniques disclosed herein are applicable to any type of working vehicle, including any type of compactor, such as a soil compactor, and are not limited to the type shown in FIG. 1.

The compactor 100 includes an operator station 106 which may be equipped with various systems and mechanisms for control of the operating of the compactor 100. However, the operator station 106 may not be utilized if the working vehicle is configured for autonomous operation. The compactor 100 can include a drive system 108 (indicated to include a shift lever), a steering system 110 (indicated to include a steering wheel) and an operational controller 111. The drive system 108 can additionally include an engine 112 and a generator 114 coupled with the engine 112, which can be attached to a frame 115 of the compactor 100. The generator 114 can serve as an electrical power source for various onboard systems and components, including the operational controller 111. The engine 112 can comprise any type of engine (internal combustion, gas, diesel, gaseous fuel, natural gas, propane, etc.), can be of any size, with any number of cylinders, and in any configuration. The engine 112 can be configured to drive movement of the compactor 100 and can also drive other components such as the generator 114. According to some examples, the engine 112 can comprise an electric motor.

Construction of one example of the operational controller 111 will be discussed further in reference to FIG. 3 below. The operational controller 111 can include a processor and a memory component. The processor may be a microprocessor or other processor as known in the art. The operational controller 111 can be configured to communicate with and control various systems and components as described herein.

The steering system 110 can include various mechanisms and devices not specifically shown but known in the art. For example, the steering system 110 can include a. friction device in communication with the operational controller 111 and configured to create resistance to movement by the operator of the steering wheel. Friction devices are well known in the art and can create resistance mechanically, electrically, by use of a variable viscosity fluid, or the like. Similarly, the steering system 110 can include a steering control valve in communication with the operational controller 111. The steering control valve can be configured to receive processed steering input from the operational controller 111 and, based on that input, to steer the compactor 100 by controlling the angular movement of the drums 102, 104, as is known in the art.

The steering system 110 can be configured to receive operator steering input. As is further discussed herein, the steering system 110 can alternatively or additionally be configured to be controlled automatically by the operational controller 111 in some examples. Thus, the steering system 110 can be communicatively coupled for communication with the operational controller 111. In some examples, the steering system 110 can be configured to transmit the operator steering input to the operational controller 111 for processing.

Similarly, the drive system 108 can be configured to receive operator input such as to increase or decrease a speed of the compactor 100. As is further discussed herein, the drive system 108 can alternatively or additionally be configured to be controlled automatically by the operational controller 111 in some examples. Thus, the drive system 108 can be communicatively coupled for communication with the operational controller 111. In some examples, the drive system 108 can be configured to transmit the operator input to the operational controller 111 for processing.

In yet further examples, the compactor 100 can have a braking system 116 configured to receive operator input to decrease or arrest a speed of the compactor 100. The braking system 116 can alternatively or additionally be configured to be controlled automatically by the operational controller 111 in some examples. Thus, the braking system 116 can be communicatively coupled for communication with the operational controller 111.

As discussed above, it should be appreciated that the compactor 100 is illustrative only and a wide variety of the compactors 100 can be designed and/or controlled in accordance with the present disclosure. For example, rather than a. double drum compactor, the compactor 100 might include only a single drum and some other type of compacting element. For instance, the front compacting element might be a drum, and the back compacting element could be a pneumatic compacting element. Compactors with a split drum are also contemplated. Moreover, the compactor 100 might comprise a tow-behind or pushed compacting apparatus, a soil compacting apparatus, etc. The operator station 106 might also be dispensed with in versions where the compactor 100 is operated in an autonomous fashion and a remote control or self-guidance system is used. As is further discussed herein, the systems, methods and techniques can control of a movement of the compactor 100 within a compacting area.

Specific to the compactor 100 of FIG. 1, each of the front drum 102 and the back drum 104 includes a drum surface 117 for compacting asphalt. The drum surface 117 may consist of a cylindrical, smooth metallic surface comprising the exterior of a shell of the front and back drums 102 and 104. As the compactor 100 is passed across an asphalt mat to compact it, the drum surface 117 will roll against a material (i.e. an asphalt mat) laid by a paver (not shown). As a result, the asphalt of the mat will increase in density and develop a relatively smooth surface finish.

As shown in FIG. 1, the compactor 100 can include an object detection system 118 that includes one or more sensors 119. The one or more sensors 119 can be mounted to or otherwise associated with the compactor 100 at one or more locations. For simplicity, only a single sensor 119 and mounting location is illustrated. It is recognized that multiple sensors and multiple mounting locations are contemplated. The object detection system 118 can be configured to pivot (as shown by arrow) or otherwise move according to some examples. Thus, if the compactor 100 is making a turn, the mount for the one or more sensors 119 could pivot or otherwise move with the turn, for example.

The object detection system 118 via the one or more sensors 119 can be configured to detect an object within the work area (e.g. adjacent the compactor 100). As further discussed and illustrated herein, the object detection system 118 can have a field of perception. This field of perception can comprise an area or volume in which the object is detectable by the one or more sensors 119. Objects that can be detected include, but are not limited to, persons, terrain features (e.g., rocks), and/or other vehicles.

The object detection system 118 can comprise a perception system. The object detection system 118 may include one or more systems such as a radar system, a SONAR system, a LIDAR system, a camera vision system, and/or any other desired system that operate with associated one or more sensors 119. One or more sensors 119 may generate data that is received by the controller 111 or another dedicated controller that is part of the object detection system 118. This data can be used by the controller to control the compactor 100 as further discussed herein including by limiting the speed of the compactor 100. The object detection system 118 and/or controller 111 can identify the presence and position of obstacles within the range of the sensors 119.

In addition or in alternative to the arrangement shown in FIG. 1, the object detection system 118 may include the one or more sensors 119, which can be remote from the compactor 100 such as a camera or other visual detection device placed. adjacent the compactor 100 in or adjacent the work area. Thus, the one or more sensors 119 can be mounted on a mobile machine or device including a drone or unmanned aerial vehicle (not shown).

The operational controller 111 can be coupled to the compactor 100 and communicatively coupled to the various systems discussed. Thus, the operational controller 111 can be communicatively coupled with the one or more sensors 119, for example. The one or more sensors can be configured to generate data indicative of operational criteria of the compactor 100 and send the data as signals to the operational controller 111, which can be configured to receive such signals/data. The one or more sensors can include those of the object detection system (the one or more sensors 119), a speed sensor 122 such as GPS can be configured to measure a speed of the compactor 100 over a surface within the work area. Further one or more sensors can also be used in some examples. Such further sensors can include, for example, a compaction sensor configured to measure a density and/or modulus of a construction material that forms the surface, a temperature sensor configured to measure a temperature of the construction material the forms the surface, a slope sensor configured to measure a slope of the surface, a moisture sensor configured to sense a moisture content such as of soil within the work area, and/or a steering sensor. According to one example the temperature sensor can be a visual sensor such as an infra-red sensor(s) configured to deliver real-time readings to the operational controller 111 and/or the operator. The data from the sensors can provided for temperature mapping, a visual readout of mat temperature in order to keep the compactor 100 in the proper temperature range (e.g., avoid tender-zones that can occur in the range of 104°-110° C. (219°-230° F.) temperature range). The compaction sensor can comprise an accelerometer or another type of sensor that can be used as part of a compaction system as variously described in U.S. Patent Application Serial Nos. US2012/0107045A1 and US20140348587A1, co-owned by the applicant, the entire contents of which are incorporated in their entireties.

The steering sensor can be mounted on the compactor 100 and can be configured to measure steering angle, movement, steering speed, or rate of movement, of the steering wheel (not shown) by the operator. The steering sensor can comprise magnetic reed switch(es), Hall Effect sensor(s), accelerometer(s), and magnetometer, among other example rotary/orientation sensors, for example. The steering sensor can be in electronic communication with the operative controller 111 and can be configured to transmit data to the operative controller 111 indicative of the measured data (e.g., steering angle, movement, steering speed, rate of movement, other data relevant to steering, etc.). Steering speed is the rate at which the steering wheel is turned or moved by the operator in order to turn the drum(s) of the compactor 100. In an embodiment in which a steering wheel is utilized, the steering speed may be the rate at which the steering wheel is rotated by the operator. In an embodiment with a joystick rather than a steering wheel, the steering speed may be the rate at which a joystick may be pushed or pulled by the operator to turn the drums of the compactor 100 as it moves. As used herein, the steering angle connotes a path or vector of the working vehicle (here compactor 100). This can be measured relative to a straight line path. The steering angle can be 0 degrees in the case of a straight line path. The steering angle can be non-zero if the vehicles is executing a turn. Steering angle for directing forward and reverse motion of the compactor 100 are contemplated.

Figure 2:
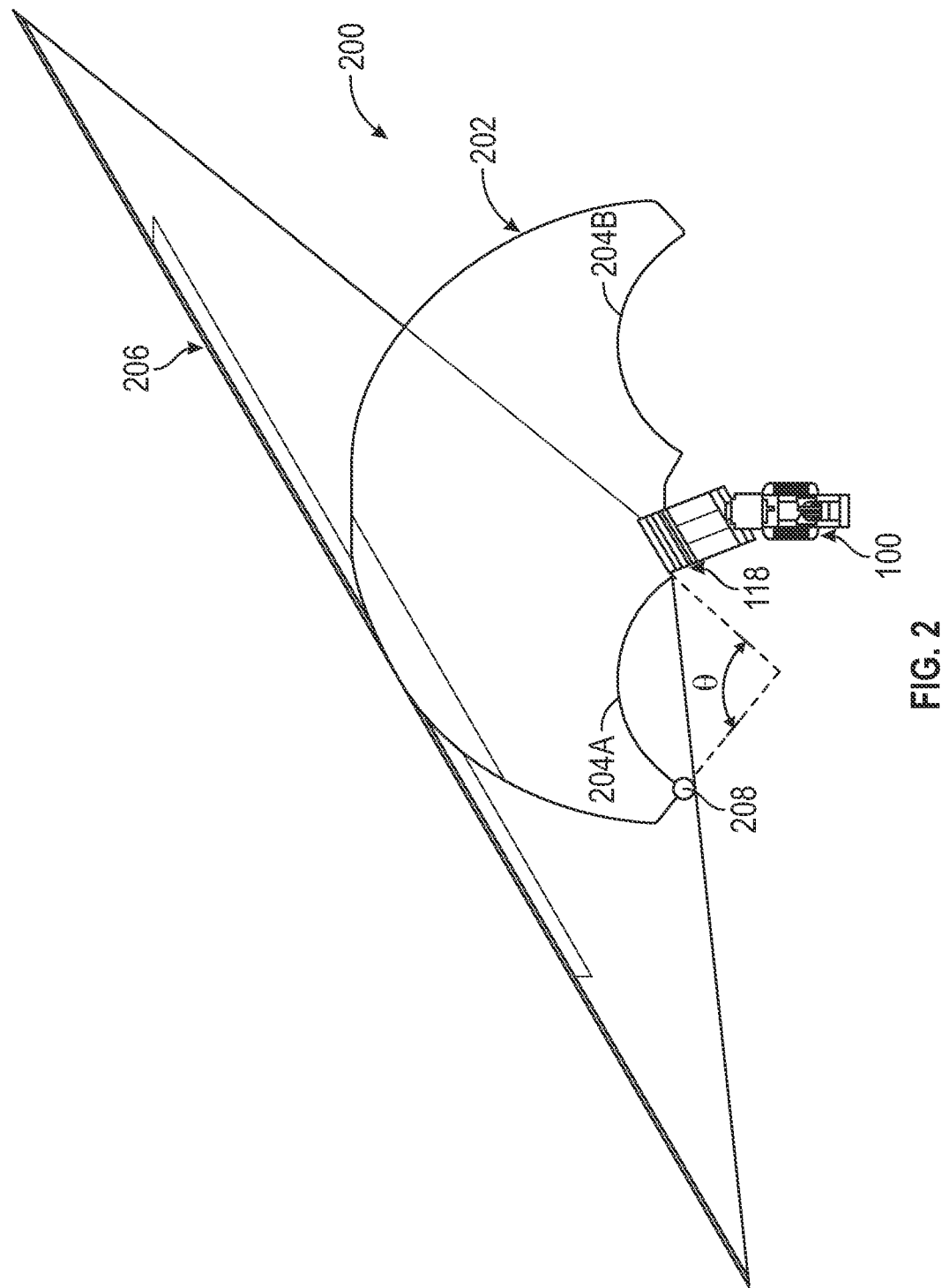
FIG. 2 is a schematic diagram of the compactor of FIG. 1 operating within a working area and having a field of perception from an object detection system.

FIG. 2 shows the compactor 100 operating within a work area 200. The work area 200 has an area 202 where the compactor 100 could possibly travel with forward movement. This area 202 is comprised of various possible operational paths of the compactor as dictated by different steering angles. The construction of the area 202 and how it is determined is further discussed and illustrated with regard to the example of FIG. 5. Edges 204A and 204B of the area 202 each represent a path that can be achieved by a maximum possible steering angle of the compactor 100 with either a left hand turn or a right hand turn. This maximum possible steering angle can be dictated by inputs that result from the configuration of the compactor 100 as further discussed subsequently.

FIG. 2 additionally illustrates a field of perception 206 of the object detection system 118 according to an exemplary embodiment. This field of perception 206 can be cone shaped (shown as triangular shaped in the plan view of FIG. 2), according to one embodiment. However, the shape of the field or perception 206 is exemplary and may differ in different embodiments (e.g., with multiple sensor locations being used). The shape of the field of perception 206 can result in an object to the side of the compactor 100 being located relatively nearer to the compactor 100 when first perceived than would be the case if the object were located in another part of the work area 200 (e.g., along a straight line path, for example).

As discussed, the field of perception 206 can comprise an area or volume in which the object is detectable by the one or more sensors 119 (FIG. 1). As shown in FIG. 2, the field of perception 206 and the area 202 can overlap one another (shown as overlayed in FIG. 2). However, portions of the area 202 may not overlap with the field of perception 206 as shown in FIG. 2. These portions comprise regions of the work area 200 where an object would not be detected by the object detection system 118. Overlaying (i.e., spatially comparing) the field of perception 206 with the area 202 can be used to determine a location 208 where the compactor 100 would exit the field of perception 206. This location 208 comprises a limit or edge of the field of perception 206. Additionally, this location 208 can also be thought of as the location at which an object would first enter the field of perception 206. Location 208 can comprise just one of many locations that comprise the limit or edge of the field of perception 206. However, the location 208 can be the limit or edge of the field of perception 206 closest to the compactor 100 as a result of the shape of the area 202 (e.g. edge 204A results from the maximum possible steering angle of the compactor 100).

Recall, turning (i.e. with a steering angle above a threshold degree) while traveling at an undesirably fast rate of speed can limit the ability of the object detection system 118 to effectively detect the object and for evasive action (stop, halt turn, brake, etc.) to be taken to avoid collision with the object. Thus, in some instances it can be desirable to reduce speed of the working vehicle when performing a turn. Thus, the present application contemplates controlling speed of the working vehicle based upon the steering angle.

Figure 3:
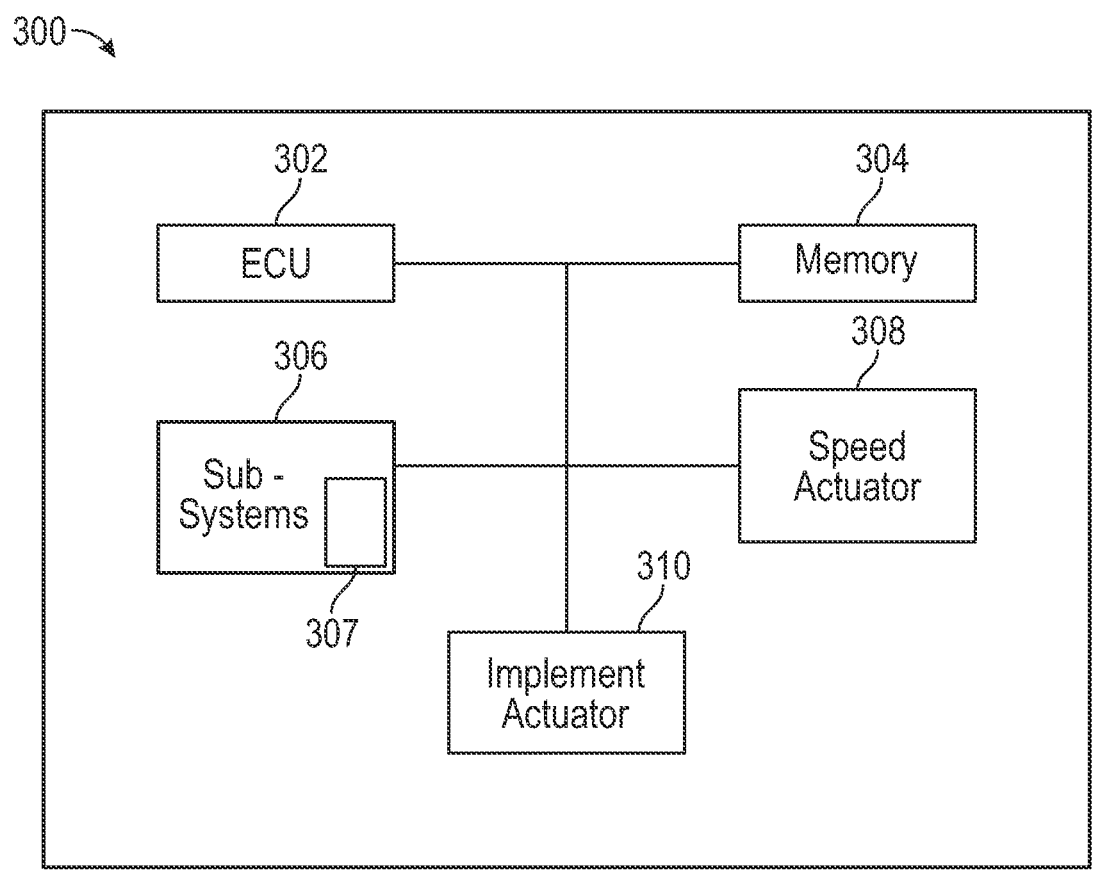
FIG. 3 is a diagram of a system that can be used with the exemplary compactor of FIG. 1 to control the compactor movement.

FIG. 3 shows a schematic of a system 300 to control movement of the compactor 100 as previously discussed. The system 300 can include or comprise the operation controller 111 in some examples. The controller 111 can be, as in the example of FIG. 3, an electronic control unit (ECU) 302. In the example of FIG. 3, the ECU 302 can be coupled to the compactor or can be remote therefrom. The control system can include transmitter, receiver, transceiver, and other componentry component (not specifically illustrated) configured to enable ECU 302 to communicate and exchange information, data, signals, as examples, with other systems and/or machines/vehicles.

The control system 300 can be an embedded system that controls machine electrical systems and/or other subsystems of the vehicle. Types of ECUs include Object Detection Module, Electronic/engine Control Module, Powertrain Control Module, Transmission Control Module, Brake Control Module, Suspension Control Module, among other examples. In the case of industrial, construction, and other heavy machinery, example ECUs can also include an Implement Control Module associated with one or more implements coupled to and operable from the vehicle.

The system 300 and the ECU 302 and other electronic controls of compactor 100, can include software, hardware, and combinations of hardware and software configured to execute a number of functions attributed to the components in the disclosed examples. The ECU 302 or other electronic controls of compactor can be an analog, digital, or combination analog and digital controllers including a number of components. As examples, the ECUs and other electronic controls of compactor 100 can include integrated circuit boards or ICB(s), printed circuit boards PCB(s), processor(s), data storage devices, switches, relays, etc. Examples of processors can include any one or more of a microprocessor, a controller, a digital signal processor (DSP), an application specific integrated circuit (ASIC), a field-programmable gate array (FPGA), or equivalent discrete or integrated logic circuitry.

The control system 300 can include memory 304 (e.g., storage media) to store and/or retrieve data or other information, for example, signals from sub-systems 306 (e.g., Speed Detection (GPS), Object Detection, Electronic/engine, Powertrain, Transmission, Brake, Suspension, etc.) that can each include one more sensors 307. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, ECU 302.

The system 300 including the components shown in FIG. 3 can be configured to communicate with one another and with other components of compactor 100 via various wired or wireless communications technologies and components using various public and/or proprietary standards and/or protocols. Examples of transport mediums and protocols for electronic communication between components of compactor 100 include Ethernet, Transmission Control Protocol/Internet Protocol (TCP/IP), 802.11 or Bluetooth, or other standard or proprietary transport mediums and communication protocols.

According to the example of FIG. 3, the system 300 can include a speed actuator 308 configured to execute commands of the implement actuator 310. The implement actuator 310 can communicate with all of the ECU 302, memory 304, sub-systems 306 and speed actuator 308. The speed actuator 308 can couple with the drive system and/or the braking system to control speed of movement of the compactor. For example, the speed actuator 308 can communicate with the drive system and/or brake system as previously discussed in reference to FIG. 1. Signals from the system 300 via the speed actuator 308 can control the speed of the compactor such that turns are executed with an appropriate speed considering the object detection system as is further described herein. Thus, the system 300 implemented in hardware, software, and combinations thereof, can be configured to automatically control movement (e.g., the speed during at least some steering angles) and/or other aspects of the compactor operation without intervention by or interaction from the operator according to some examples.

The system 300 can be configured, for example, to automatically control the speed of the vehicle when certain conditions (e.g., a sharp turn above a threshold steering angle) is detected. As discussed previously, the system 300 can be configured to communicate with and receive signals, data, or other information from one or more sensors 307 (such as GPS for vehicle speed) that are configured to detect, measure, etc. one or conditions of factors and/or parameters related to vehicle operation including the presence of the object(s) in the work area. The system 300 can, for example, be configured to receive signals from and can be configured to automatically control movement of the vehicle based upon such one or more sensors 307 (e.g., apply the brake system to slow or stop movement of the vehicle, actuate the steering system to perform a turn having a desired steering angle, actuate the steering system to bring the compactor out of a turn where collision with an object may otherwise occur, etc).

The present disclosure recognizes, among other things, that automated vehicle movement controls, e.g. the same or similar to those discussed above, can be utilized to supplement or limit human operation of the compactor such as in the aspect of making appropriate turns at an appropriate speed for the compactor (given operating conditions/factors) to better avoid chances of a collision with objects to the side of the compactor.

Figure 4:
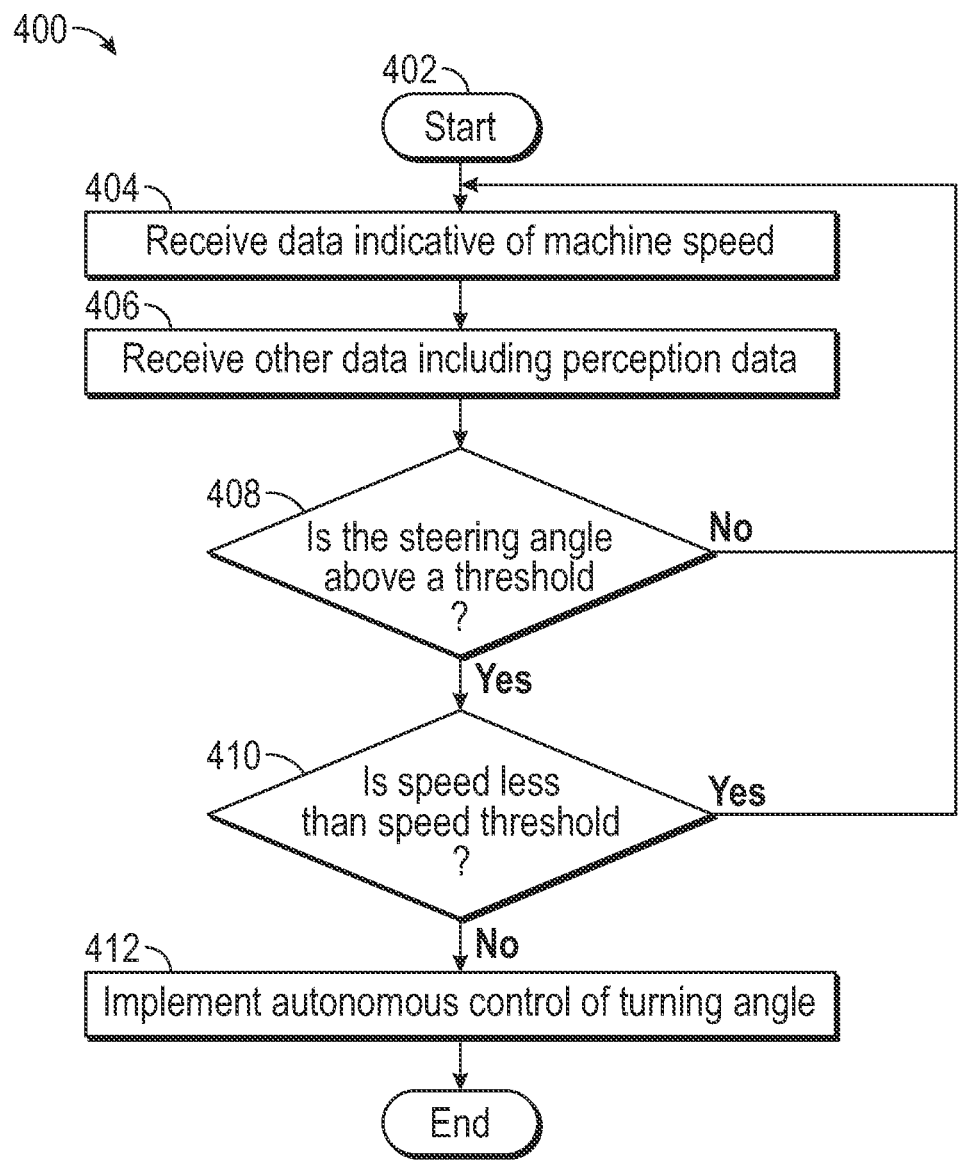
FIG. 4 is a flowchart depicting an example method of operating a compactor in accordance with this disclosure.

FIG. 4 is a flowchart depicting an example method 400 for control of a movement of a compactor within a compacting area in accordance with this disclosure. In FIG. 4, the method 400 includes a start 402 and a step 404 of receiving data indicative of compactor speed from one or more sensors. In the example of FIG. 4, the method 400 can include a step 406 of receiving other data regarding operational criteria including perception data from the object detection system. This other data can be automatically input, derived from sensor data, etc. as previously discussed. The step 406 can be done contemporaneous with other steps of the method 400, prior to step 404, or may not be performed at all according to some examples. The method 400 proceeds to step 408 where it is determined if the working vehicle has a steering angle above a threshold angle. If the steering angle is below the threshold, the method can restart at start 402 an no speed restrictions on the compactor need be implemented. However, if the steering angle is above the threshold angle the method 400 proceeds to step 410.

At step 410, the method 400 can determine if the speed is less than a maximum speed given the steering angle. If it is determined that the speed of the compactor is less than the maximum speed appropriate for the steering angle the method 400 can re-start. However, if the speed is determined to exceed the maximum speed appropriate for the steering angle at step 410, the method 400 can proceed to the step 412. At step 412, the method 400 can implement an autonomous control of the speed to an appropriate speed based on the steering angle (turning radius) of the compactor.

Thus, the method 400 can include directing the movement the compactor by controlling the speed based upon the steering angle as described. The method 400 can include sensing one or more operational criteria of the compactor including a speed of the compactor over a surface within the work area and sensing perception data regarding the work area. The method 400 can control the speed of the compactor further based upon a location of an edge of a field of perception of the object detection system.

INDUSTRIAL APPLICABILITY

The present application discloses working vehicles such as the compactor 100 that can include controls/controllers (111, 300) that are configured to monitor and, in some cases, automatically control various aspects of vehicle operation including the speed of the vehicle based upon the steering angle. In some cases, such working vehicles can include controls, which, in conjunction with and/or independent of operator control, control aspects of the movement of the working vehicle such as the speed within the work area. Thus, in the compacting area, vehicle operating speed can be controlled so as to be limited based upon steering angle and considering aspects such as the edge of the field of perception 206 of the object detection system 118 as described herein. In this manner, a likelihood of collision with an object in the working area such as on a side of the working vehicle can be reduced or avoided.

In one specific example, a Caterpillar® CS56B vibratory soil compactor having a solid drum and an operating weight of 26,703 lbs., drum width of 2134 mm and wheelbase of 2900 mm is disclosed. The compactor is capable of a maximum speed of 12 km/h (3.33 m/s) and is capable of a turning angle of 34 degrees. The compactor has a stopping distance of 4.2 m. Reference Table 1 shows a summary of various data related to aspects of the soil compactor.

Reference Table 1
Reference Table

| Steering Angle | Deg to Rad | Front to Back Distance (mm) | Turning Radius r (mm), Center of Machine | Turning Radius r (mm), Outer Bound of Machine | Turning Radius r (mm), Inner Bound of Machine |
|---|---|---|---|---|---|
| 0 | 0 | 2900 | #DIV/0! | #DIV/0! | #DIV/0! |
| 1 | 0.017 | 2899.78 | 166153.54 | 167220.54 | 165086.54 |
| 2 | 0.035 | 2899.12 | 83070.44 | 84137.44 | 82003.44 |
| 3 | 0.052 | 2898.01 | 55373.27 | 56440.27 | 54306.27 |
| 4 | 0.070 | 2896.47 | 41522.57 | 42589.57 | 40455.57 |
| 5 | 0.087 | 2894.48 | 33210.46 | 34277.46 | 32143.46 |
| 6 | 0.105 | 2892.06 | 27667.65 | 28734.65 | 26600.35 |
| 7 | 0.122 | 2889.19 | 23707.29 | 24774.29 | 22640.29 |
| 8 | 0.140 | 2885.89 | 20735.97 | 21802.97 | 19668.97 |
| 9 | 0.157 | 2882.15 | 18424.00 | 19491.00 | 17357.00 |
| 10 | 0.175 | 2877.97 | 16573.58 | 17640.58 | 15506.58 |
| 11 | 0.192 | 2873.39 | 15058.83 | 16125.83 | 13991.83 |
| 12 | 0.209 | 2868.31 | 13795.83 | 14862.83 | 12728.83 |
| 13 | 0.227 | 2862.84 | 12726.49 | 13793.49 | 11659.49 |
| 14 | 0.244 | 2856.93 | 11809.30 | 12876.30 | 10742.30 |
| 15 | 0.262 | 2850.59 | 11013.84 | 12080.84 | 9946.84 |
| 16 | 0.279 | 2843.83 | 10317.29 | 11384.29 | 9250.29 |
| 17 | 0.297 | 2836.64 | 9702.18 | 10769.18 | 8635.18 |
| 18 | 0.314 | 2829.03 | 9154.94 | 10221.94 | 8087.94 |
| 19 | 0.332 | 2821.00 | 8664.86 | 9731.86 | 7597.86 |
| 20 | 0.349 | 2812.55 | 8223.36 | 9290.36 | 7156.36 |
| 21 | 0.367 | 2803.69 | 7823.50 | 8890.50 | 6756.50 |
| 22 | 0.384 | 2794.42 | 7459.60 | 8526.60 | 6392.60 |
| 23 | 0.401 | 2784.73 | 7126.98 | 8193.98 | 6059.98 |
| 24 | 0.419 | 2774.64 | 6821.71 | 7888.71 | 5754.71 |
| 25 | 0.436 | 2764.15 | 6540.53 | 7607.53 | 5473.53 |
| 26 | 0.454 | 2753.25 | 6280.64 | 7347.64 | 5213.64 |
| 27 | 0.471 | 2741.96 | 6039.68 | 7106.68 | 4972.68 |
| 28 | 0.489 | 2730.27 | 5815.63 | 6882.63 | 4748.63 |
| 29 | 0.506 | 2718.20 | 5606.73 | 6673.73 | 4536.73 |
| 30 | 0.524 | 2705.74 | 5411.47 | 6478.47 | 4344.47 |
| 31 | 0.541 | 2692.89 | 5228.53 | 6295.53 | 4161.53 |
| 32 | 0.559 | 2679.67 | 5056.75 | 6123.75 | 3989.75 |
| 33 | 0.576 | 2666.07 | 4895.12 | 5962.12 | 3828.12 |
| 34 | 0.593 | 2652.10 | 4742.74 | 5809.74 | 3975.74 |

Recall the inputs to be wheel base of 2900 mm and drum width of 2134 mm. Degrees to Radian converts the steering angle from degrees to radian. Front to back distance is calculated according to the Equation 1:

Front to Back Distance=Wheelbase*Cos(Deg to Rad)+(Wheelbase/2)

Turning radius is calculated according to the Equation 2:

Turning Radius r(mm), Center of machine=Front to Back Distance(mm)/SIN(Deg to Rad)

Inner and outer bounds can be calculated by adding and subtracting the (drum width)/2.

Figure 5:
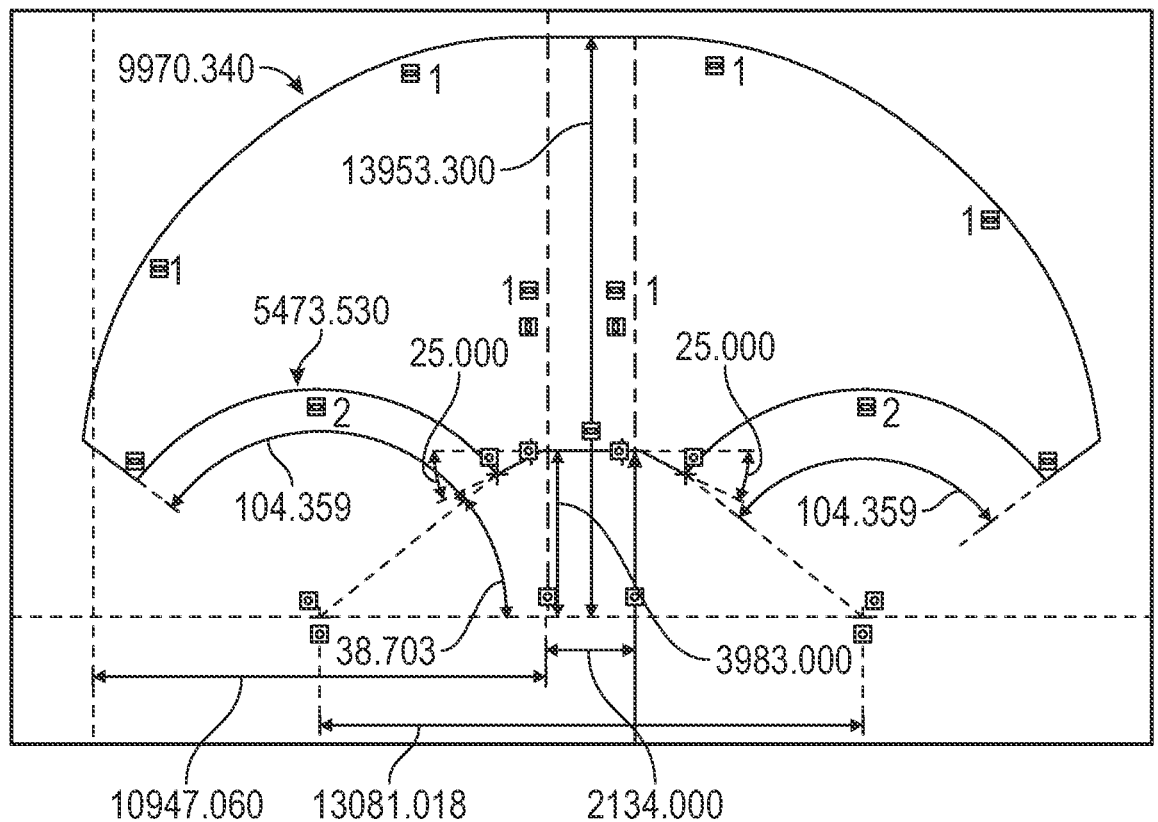
FIG. 5 illustrates an area where the compactor could possibly travel with forward movement specifically described in reference to the compactor of the Industrial Applicability example provided herein.

From the Reference Table 1 the area 202 (previously shown in FIG. 2) and now reproduced in FIG. 5 can be geometrically derived from the Reference Table 1. Recall the area 202 represents the area the compactor could travel at various possible steering angles and includes edges 204A and 204B defined by the maximum possible turning angle. As shown in FIG. 5:

104.359°: is the Angle found in calculations (see below)

25°: Steering angle 5473.53 mm: Turning radius (inner)

10947.06 mm: Turning Diameter 2134 mm : Drum Width 13081.018 mm: (2*5473.53)+2134=13081 mm 3983 mm: Distance from the axle to the front of the drum 13953.3 mm: An edge of field of perception zone (9970.34)+distance from axle to front drum (3983)=13953.3 mm 38.703° mm: Angle to the blade when steered at 25°

9970.34 mm: Calculations for this value are reproduced below

Regarding the calculated value of 9970.34 mm, this can be calculated from the Equation 3:

$$s(\text{arc length}) = r * \Theta$$

Θ is shown in FIGS. 2 and 4 and can be solved for using trigonometry to found to be 104.359° or 1.814 radians. For a vehicle steering angle at 25°, the inner turning radius is 5474 mm as indicated in Reference Table 1. Thus, according to Equation 3: s=5474 mm*1.8214 radians=9970.34 mm=9.97 m. This means that the compactor can travel 9.97 m before leaving the field of perception as defined by area 202.

The edge of the field of perception can also be calculated according to Equation 4:

Edge of the field of perception zone=distance the compactor traveled in the time it takes to detect the moving object+stopping distance+moving object distance traveled+safety factor Equation 4 recognizes the system has some latency period between when the object enters the field of perception and when action in response can be implemented. This is represented as distance but can also be a time value.

As an example, if object detection time is 1.5 seconds, this represents the time it takes for the object detection system to detect the object once it is in range and for the system to implement action(s) to avoid collision. The safety factor can be any desired value. According to one example it can be selected to be 2 m. Vehicle deceleration can be derived from stopping distance (machine dependent) and the maximum speed of the compactor (again machine dependent). If the stopping distance for the compactor is 4.2 m and the maximum speed 3.33 m/s, the time to stop at the maximum speed is 4.2/3.33=1.27 seconds. The 1.27 seconds to stop is assumed to be a worst case scenario. The deceleration rate can be calculated as (3.33 m/s)/(1.27 s)=2.62 m/s$^2$.

The object in some cases can be moving towards or away from the compactor. Assuming the object is moving toward the compactor at 3.5 m/s and object detection time takes 1.5 seconds, the moving object distance can be 3.5*1.5=5.25 m.

Thus, using the Equation 4 above, and the example values provided, edge of the field of perception can be calculated as:

9.97 m (value determined from Equation 3)=(x(1.5 s))+(x*(1.27))+5.25+2, where x=speed in m/s. Solving for x, x=0.982 m/s or 3.54 km/h. Therefore, the compactor can travel at up to 3.54 km/h while steered at 25° to stay within the field of perception of the object detection system.

Speed at each of the multiple possible steering angles can be calculated as shown in Table 2 below:

TABLE 2

| Steering Angle | Speed (kph) |
|---|---|
| 0 | 12.00 |
| 1 | 12.00 |
| 3 | 12.00 |
| 4 | 12.00 |
| 5 | 12.00 |
| 6 | 12.00 |
| 7 | 12.00 |

TABLE 2-continued

| Steering Angle | Speed (kph) |
|---|---|
| 8 | 12.00 |
| 9 | 12.00 |
| 10 | 12.00 |
| 11 | 12.00 |
| 12 | 12.00 |
| 13 | 12.00 |
| 14 | 12.00 |
| 15 | 12.00 |
| 16 | 12.00 |
| 17 | 12.00 |
| 21 | 7.64 |
| 25 | 3.54 |
| 27 | 1.92 |
| 30 | 0.00 |
| 32 | 0.00 |
| 34 | 0.00 |

Figure 6:
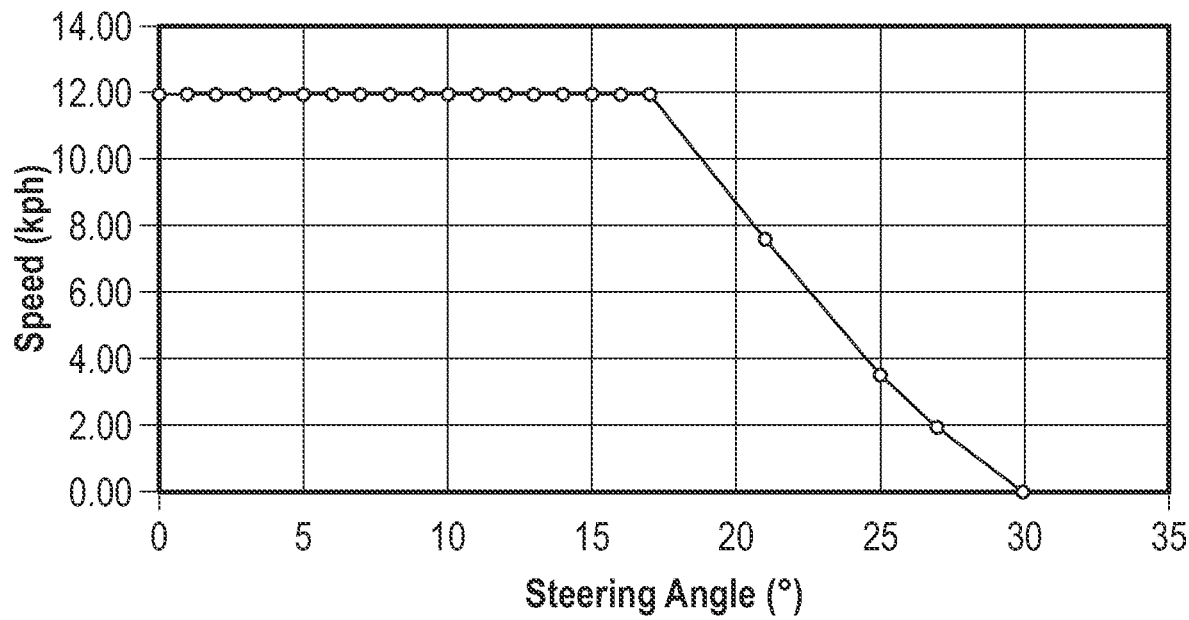
FIG. 6 is a plot of speed reducing with steering angle for the compactor of the Industrial Applicability example.

These speeds from the Table 2 are graphically shown in FIG. 6. It was calculated that at about half steer (17°) that the compactor could still travel at full speed. So, intermediate speeds between 17°-34° were taken. Speeds were found to decrease linearly with steering angle. 17° represents a threshold angle where limits to the speed should be implemented. A controller would also implement limits to the speed in a linear manner with respect to the steering angle if the steering angle of the working vehicle is above the threshold angle as shown in FIG. 6.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A system for control of a movement of a working vehicle within a work area, the system comprising:
    a steering system configured to direct the movement of the working vehicle;
    a drive system configured to propel the working vehicle;
    an object detection system having one or more sensors configured to detect an object within the work area;
    a speed sensor configured to measure a speed of the working vehicle over a surface within the work area; and
    a controller communicatively coupled to the steering system, the drive system, the object detection system, and the speed sensor, the controller configured to control the speed of the working vehicle based upon a steering angle of the working vehicle by limiting the drive system when the steering angle is at or above a threshold steering angle up to a maximum possible steering angle, and wherein, when the steering angle is below the threshold steering angle, the drive system propels the working vehicle at a maximum possible constant speed without the controller limiting the drive system.

2. The system of claim 1, further comprising a braking system, wherein the controller is configured to control the speed of the working vehicle based upon a braking distance of the working vehicle as implemented by the braking system.

3. The system of claim 1, wherein the controller automatically limits the speed if an operator exceeds a predetermined steering angle.

4. A system for control of a movement of a working vehicle within a work area, the system comprising:
   a steering system configured to direct the movement of the working vehicle;
   a drive system configured to propel the working vehicle;
   an object detection system having one or more sensors configured to detect an object within the work area;
   a speed sensor configured to measure a speed of the working vehicle over a surface within the work area; and
   a controller communicatively coupled to the steering system, the drive system, the object detection system, and the speed sensor, the controller configured to control the speed of the working vehicle based upon a steering angle of the working vehicle by limiting the drive system, wherein the working vehicle comprises a compactor and the controller is configured to control the speed of the compactor based upon the steering angle of the compactor, a field of perception of the object detection system, a stopping distance of the compactor, a wheelbase of the compactor and a drum width of the compactor.

5. The system of claim 1, wherein the controller is configured to control the speed of the working vehicle based upon the steering angle of the working vehicle and one or more of:
   determining a time for the object detection system to detect the object once the object is within a range of the one or more sensors;
   determining a deceleration rate based upon a stopping distance of the working vehicle; and
   determining a speed of the object moving within the work area.

6. The system of claim 5, wherein determining the time for the object detection system to detect the object once the object is within the range of the one or more sensors, the controller determines a field of perception of the one or more sensors of the object detection system and a location of the object within the field of perception.

7. The system of claim 1, wherein the controller is configured to control the speed of the working vehicle based upon the steering angle of the working vehicle by comparing the steering angle with the maximum possible steering angle and the speed to the maximum possible speed of the working vehicle.

8. The system of claim 7, wherein the maximum possible speed the working vehicle travels with the maximum possible steering angle is based on:
   determining a turning radius based on the steering angle;
   determining a field of perception of the one or more sensors of the object detection system based upon a location where the working vehicle would exit a field of perception;
   determining the turning radius that corresponds to the location where the working vehicle would exit the field of perception; and
   determining an arc length that the working vehicle would travel.

9. A system for control of a movement of a working vehicle within a work area, the system comprising:
   a steering system configured to direct the movement of the working vehicle;
   a drive system configured to propel the working vehicle;
   an object detection system having one or more sensors configured to detect an object within the work area;
   a speed sensor configured to measure a speed of the working vehicle over a surface within the work area; and
   a controller communicatively coupled to the steering system, the drive system, the object detection system, and the speed sensor, the controller configured to control the speed of the working vehicle based upon a steering angle of the working vehicle by limiting the drive system, wherein the controller is configured to control the speed of the working vehicle based upon the steering angle of the working vehicle and by:
   determining an area the working vehicle can possibly travel with a maximum possible steering angle;
   determining a field of perception of the one or more sensors of the object detection system;
   spatially comparing the area the working vehicle can possibly travel with the field of perception; and
   determining a location of an edge of the field of perception based upon the spatially comparing the area the working vehicle can possibly travel with the field of perception.

10. The system of claim 1, wherein the controller limits the speed in a linear manner with respect to the steering angle if the steering angle of the working vehicle is above the threshold angle.

* * * * *